United States Patent

Broyles

(10) Patent No.: US 8,171,302 B2
(45) Date of Patent: May 1, 2012

(54) METHOD AND SYSTEM FOR CREATING A PRE-SHARED KEY

(75) Inventor: Paul J. Broyles, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/033,257

(22) Filed: Feb. 23, 2011

(65) Prior Publication Data

US 2011/0154458 A1 Jun. 23, 2011

Related U.S. Application Data

(63) Continuation of application No. 11/442,872, filed on May 30, 2006.

(51) Int. Cl.
| G06F 21/00 | (2006.01) |
| G06F 7/04 | (2006.01) |
| G06F 15/16 | (2006.01) |
| G06F 17/30 | (2006.01) |
| H04L 29/06 | (2006.01) |
| G06F 15/177 | (2006.01) |

(52) U.S. Cl. ........ 713/184; 709/220; 709/221; 709/222; 726/6; 726/18

(58) Field of Classification Search ................... 713/184; 726/6, 18; 709/220, 221
See application file for complete search history.

(56) References Cited

U.S. PATENT DOCUMENTS

| 5,666,415 | A | * | 9/1997 | Kaufman | 713/159 |
| 6,470,454 | B1 | * | 10/2002 | Challener et al. | 726/17 |
| 6,535,976 | B1 | | 3/2003 | Hoggarth et al. | |
| 6,567,868 | B1 | | 5/2003 | Tran et al. | |
| 6,601,175 | B1 | * | 7/2003 | Arnold et al. | 726/7 |
| 6,647,512 | B1 | | 11/2003 | James et al. | |
| 6,668,323 | B1 | * | 12/2003 | Challener et al. | 713/183 |
| 6,732,219 | B1 | | 5/2004 | Broyles | |
| 6,748,544 | B1 | | 6/2004 | Challener et al. | |
| 6,754,793 | B2 | | 6/2004 | Piwonka et al. | |
| 6,832,320 | B1 | | 12/2004 | Broyles, III et al. | |
| 6,873,333 | B1 | | 3/2005 | Patel et al. | |
| 6,938,155 | B2 | | 8/2005 | D'Sa et al. | |
| 6,948,008 | B2 | | 9/2005 | Hawkins et al. | |
| 7,003,662 | B2 | | 2/2006 | Genty et al. | |
| 7,171,685 | B2 | | 1/2007 | Batra et al. | |
| 7,398,550 | B2 | | 7/2008 | Zick et al. | |
| 7,409,575 | B2 | | 8/2008 | Komarla et al. | |
| 7,434,054 | B2 | | 10/2008 | Zick | |
| 7,603,556 | B2 | * | 10/2009 | Brown et al. | 713/169 |
| 7,694,147 | B2 | * | 4/2010 | Lott | 713/183 |
| 8,074,072 | B2 | * | 12/2011 | Brown et al. | 713/169 |
| 2002/0013811 | A1 | | 1/2002 | Kim | |
| 2002/0144126 | A1 | | 10/2002 | Valentin | |
| 2002/0178240 | A1 | | 11/2002 | Fiveash et al. | |

(Continued)

OTHER PUBLICATIONS

Intel Corporation, Secure Provisioning for PCs with Intel 945/955 Express Chipset and Intel Active Management Technology, Sep. 2008, Revision 1.1.

(Continued)

*Primary Examiner* — Christian LaForgia

(57) ABSTRACT

There is provided a system and method for creating a pre-shared key. More specifically, in one embodiment, there is provided a method comprising accessing an identifier associated with a computer system, and performing at least one mathematical function on the identifier to create a pre-shared key for the computer system.

3 Claims, 2 Drawing Sheets

U.S. PATENT DOCUMENTS

| | | |
|---|---|---|
| 2003/0051013 A1 | 3/2003 | Anthony, Jr. et al. |
| 2003/0063750 A1 | 4/2003 | Medvinsky et al. |
| 2003/0070102 A1 | 4/2003 | Kondo |
| 2003/0084352 A1 | 5/2003 | Schwartz et al. |
| 2003/0093552 A1 | 5/2003 | Nonogaki et al. |
| 2003/0208696 A1 | 11/2003 | Piwonka et al. |
| 2004/0001594 A1 | 1/2004 | Krishnaswamy et al. |
| 2004/0148499 A1 | 7/2004 | Broyles, III |
| 2004/0215954 A1 | 10/2004 | Piwonka |
| 2005/0050328 A1 | 3/2005 | Mizrah |
| 2005/0094329 A1 | 5/2005 | Broyles |
| 2005/0097371 A1 | 5/2005 | Broyles |
| 2005/0123141 A1 | 6/2005 | Suzuki |
| 2005/0138399 A1 | 6/2005 | Cheston et al. |
| 2005/0172111 A1 | 8/2005 | Marcak et al. |
| 2005/0172137 A1 | 8/2005 | Hopkins |
| 2005/0216221 A1 | 9/2005 | Broyles, III et al. |
| 2005/0229249 A1 | 10/2005 | Piwonka et al. |
| 2005/0240818 A1 | 10/2005 | James, Jr. et al. |
| 2005/0246517 A1 | 11/2005 | Volentine et al. |
| 2005/0289357 A1 | 12/2005 | Han |
| 2006/0002356 A1 | 1/2006 | Barany et al. |
| 2006/0020844 A1 | 1/2006 | Gibbons et al. |
| 2006/0020845 A1 | 1/2006 | Broyles, III et al. |
| 2006/0062384 A1 | 3/2006 | Dondeti |
| 2006/0089819 A1 | 4/2006 | Dubal |
| 2006/0095805 A1 | 5/2006 | Broyles et al. |
| 2007/0005963 A1 | 1/2007 | Eldar et al. |
| 2007/0011507 A1 | 1/2007 | Rothman et al. |
| 2007/0079368 A1 | 4/2007 | Takeyoshi et al. |
| 2007/0110245 A1 | 5/2007 | Sood et al. |
| 2008/0091794 A1 | 4/2008 | Thieringer |

OTHER PUBLICATIONS

Intel Corporation, Technology Brief—Intel Active Management Technology with Circuit Breaker Capability, 2006.

* cited by examiner

METHOD AND SYSTEM FOR CREATING A PRE-SHARED KEY

CROSS-REFERENCE TO RELATED APPLICATION

This application is a continuation of U.S. patent application Ser. No. 11/442,872, which was filed on May 30, 2006.

BACKGROUND

This section is intended to introduce the reader to various aspects of art, which may be related to various aspects of the present invention that are described and claimed below. This discussion is believed to be helpful in providing the reader with background information to facilitate a better understanding of the various aspects of the present invention. Accordingly, it should be understood that these statements are to be read in this light, and not as admissions of prior art.

Computers and computer-related technologies have become an integral part of the lives of more and more people. Many people now rely on computers for a variety of tasks, such as shopping, investing, and/or banking. However, like most other types of machines, computers may benefit from occasional or periodic maintenance, upgrades, or repairs. Years ago, such maintenance, upgrades, or repairs often involved a qualified technician or other person physically interacting with the computer (e.g., sitting in front of the computer's monitor and keyboard). In modern times, however, many types of remote access systems have been developed to enable maintenance, upgrades, or repairs to be performed remotely over a computer network. One of these tools is the Active Management Technology ("AMT") system created by Intel. AMT enables a remote console (such as another computer) to access a computer system over a network to perform some types of maintenance, upgrades, or repairs.

Although this type of remote control may enable more efficient maintenance, upgrades, or repairs, this type of remote control also raises several security concerns. For example, under the control of a malicious person, AMT could be used to erase sensitive data, shut down vital computer systems, or perform other damaging activities. For this reason, AMT includes safeguards to tightly regulate access to controllable computer systems. For example, AMT is configured to permit a remote console to control the computer system only if a pre-shared key ("PSK") stored on the remote console matches a PSK on the computer system to be controlled. Typically, this PSK includes an 8 character product ID ("PID") and a 32 character passphrase ("PPS"). AMT may also condition access based an 8 character administrative password. In this way, AMT endeavors to ensure that only authorized remote consoles are granted access and/or control of controllable computer systems.

Although the PSK and/or administrator password can provide an effective means of securing remotely controllable computer systems, it may create an additional issue—namely management and administration of the PSKs. For example, if a company wished to remotely control 1,000 or more computer systems, it may have to manage a database of 1,000 or more different PSKs and/or administrator passwords. Managing this database of PSKs and/or administrator passwords can be challenging. Moreover, because the PSKs and/or administrator passwords are often randomly generated, it may be difficult to reconstruct the PSKs and/or administrator passwords if this data is lost. This concern is particularly noteworthy for computer manufacturers that may wish to provide after-sale support for their computer systems via AMT. Besides the data storage aspects of managing a database of 1,000 or more PSKs and/or administrator passwords, providing access to the database to field technicians may create security concerns. For example, technicians may access the database of PSKs and/or administrator passwords over unsecured networks. The embodiments described herein may be directed to one or more of the issues described above.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As described above, Active Management Technology ("AMT") and other suitable remote access systems typically condition access to controllable computer systems by a remote console with a pre-shared key ("PSK") and/or administrator password. Accordingly, one or more of the embodiments described herein may be directed towards a system or a method for generating a PSK and/or administrator password for a computer system. Specifically, in one embodiment, there is provided a configuration unit configured to generate a PSK and/or administrator password for a computer system by executing one or more mathematical functions on an identifier associated with the computer system.

Figure 1:
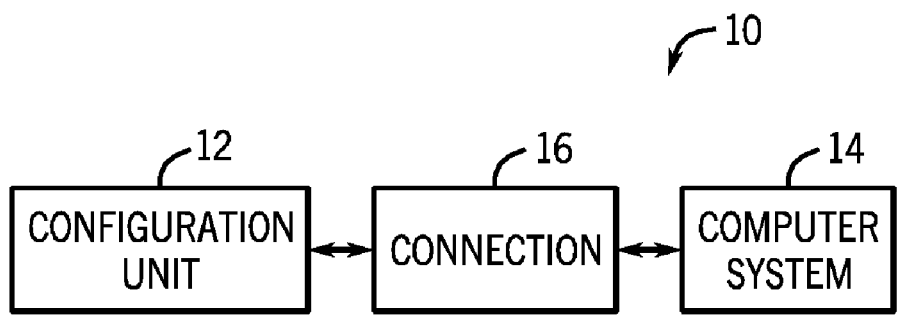
FIG. 1 is a block diagram of an exemplary configuration system in accordance with one embodiment.

Turning now to FIG. 1, a block diagram of an exemplary configuration system, in accordance with one embodiment, is illustrated and generally designated by reference numeral 10. As illustrated in FIG. 1, the configuration system 10 may include a configuration unit 12 that is coupled to a computer system 14 via a connection 16. The configuration unit 12 may include any suitable type of computer system or device employed during the manufacture, production, and/or configuration of the computer system 14. For example, in one embodiment, the configuration unit 12 may be configured to download software and/or configure downloaded software, such as an AMT software program, a basic input/output system ("BIOS"), and/or another suitable application, during the manufacturing or testing of the computer system 14. More specifically, in one embodiment, the configuration unit 12 may include a networked server that contains and downloads the pre-installed software image including specified operating system, drivers, and pre-installed applications to the computer system. As will be described further below, in one embodiment, the configuration unit 12 may be configured to generate a pre-shared key for the computer system 14 by executing one or more mathematical functions on an identifier associated with the computer system 14.

As described above, the configuration unit 12 may be coupled to the computer system 14 via a connection 16. In various embodiments, the connection 16 may include any one of a number of suitable communication interfaces and/or protocols. For example, the connection 16 may include a cable or wired connection, such as Ethernet, Gigabit Ethernet, Firewire, Universal Serial Bus ("USB"), Serial ATA, and/or another suitable public or proprietary interface. In still other embodiments, the connection 16 may include a wireless connection, such as I.E.E.E. 802.11, Bluetooth, I.E.E.E. 802.16, I.E.E.E. 802.20, and/or another suitable wireless connection. It will be appreciated, however, that the above-recited examples of the connection 16 are exemplary and not intended to be exclusive. It should be understood that the embodiments, the connection 16 may include any suitable type of connection between the configuration unit 12 and the computer system 14.

The computer system 14 may include any suitable type of computer or processor-based device capable of employing a PSK and/or administrator password to condition remote access to it. In one embodiment, the computer system 14 may include a computer system employing AMT. For example, the computer system 14 may be a modified version of a dc7600 computer system manufactured by Hewlett-Packard. However, in alternate embodiments, the computer system 14 may be any suitable computer and/or processor-based device.

As will be described further below with regard to FIGS. 2 and 3, in one embodiment, the configuration unit 12 may be configured to generate a PSK and/or administrator password for the computer system 14 by executing one or more mathematical functions on an identifier associated with the computer system 14. As such, the computer system 14 is associated with an identifier. This identifier associated with the computer system 14 may include any one of a number of suitable numbers, designators, and/or identifiers. For example, in various embodiments, the identifier associated with computer system 14 may include a purchase order number ("PO#"), a serial number, an IP or other network address, a name, a universally unique identifier ("UUID"), and/or other suitable identifier. Moreover, the identifier associated with the computer system 14 may be individual or unique to the computer system 14 or it may identify a group of computer systems of which the computer system 14 is a member. For example, one PO# may be associated with one computer or one thousand computers. In addition, employing the PO# may allow a sales team for the computer system to generate the PSK and/or administrator password for the computer system 14 before the system itself is even built. In this way, a customer may be able to configure its servers in parallel with the manufacture of the computer system 14 and be ready for the delivery of the computer system 14.

As described above, in one embodiment, the configuration unit 12 is configured to generate the PSK and/or administrator password for the computer system 14 by executing one or more mathematical functions on the identifier associated with the computer system. Accordingly, FIG. 2 is a flow chart illustrating an exemplary technique 20 for generating the PSK and/or administrator password in accordance with one embodiment. The technique 20 may be executed by the configuration unit 12. For example, code adapted to perform the technique 20 may be encoded onto a tangible medium associated with the configuration unit 12.

Figure 2:
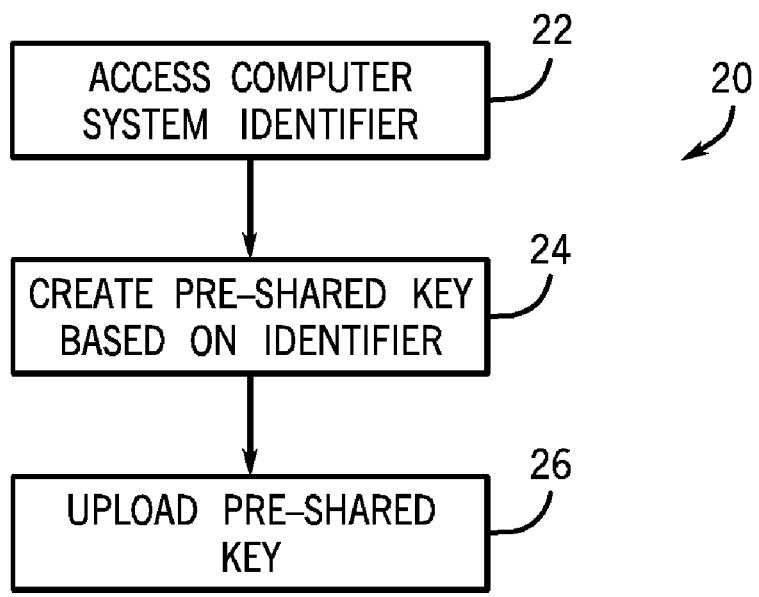
FIG. 2 is a flow chart illustrating an exemplary technique for generating a pre-shared key in accordance with one embodiment.
Figure 3:
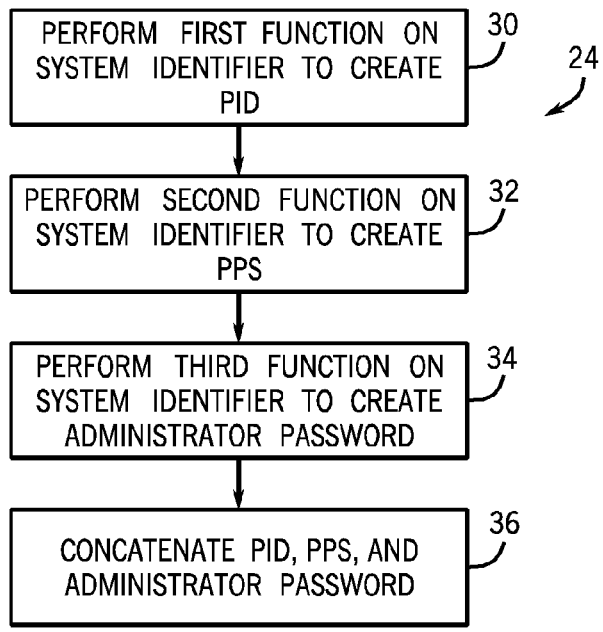
FIG. 3 is a flow chart illustrating an exemplary technique for creating a pre-shared key based on the identifier in accordance with one embodiment.

As illustrated by block 22 of FIG. 2, the technique 20 may begin with the configuration unit 12 accessing the identifier associated with the computer system 14. In one embodiment, accessing the identifier associated with computer system 14 may include accessing the computer system 14 over the connection 16 and transmitting the identifier directly from the computer system 14. In another embodiment, however, accessing the computer system's identifier may involve accessing the identifier from a storage media within or coupled to the configuration unit 12. In still another embodiment, accessing the identifier associated with the computer system 14 may involve accessing a production or manufacturing tracking system.

The technique 20 may also involve creating the PSK and/or administrator password based on the identifier associated with the computer system 14, as indicated by block 24. In one embodiment, the configuration unit 12 may generate the PSK and/or administrator password by executing one or more mathematical functions on the identifier. These mathematical functions may include shifts, additions, subtractions, and/or other logical operators. In one embodiment, the shifts, additions, subtractions, and/or other logical operators may be used to perform a one-way function on the identifier such that it is not possible to determine the shifts, additions, subtractions, and/or logical operators based on the resulting PSK and/or administrator password. In still other embodiments, the mathematical function may include a hash, such as the secured hash algorithm or other suitable hashing algorithm. It will be appreciated, however, that the above-described mathematical functions are merely exemplary and not intended to be exclusive.

As described above, block 24 of the technique 20 involves creating the PSK and/or administrator password based on the identifier associated with the computer system 14. More specifically, FIG. 3 is a flow chart illustrating one embodiment of the exemplary technique 24 for creating the PSK based on the identifier. In the embodiment described in FIG. 3, the PSK includes a 48 character PSK. More specifically, the PSK generated using the technique 24 includes an 8 character product ID ("PID") and a 32 character passphrase ("PPS"). The administrator password includes an 8 character administrator password.

As indicated by block 30 of FIG. 2, the technique 24 may begin by performing a first function on the system identifier to create the PID. For example, in one embodiment, performing the first function on the system identifier may include subtracting an arbitrary value, such as 13673773, from a purchase order number ("PO#") associated with the computer system 14.

The technique 14 may also involve performing a second function on the system identifier and/or the PID to create the PPS, as indicated by block 32. For example, the PPS may be generated using the following function:

99999999−PID:PID+12345678:PIDxorFFFFFFFF: PO#+11122233

Further, technique 24 may also involve performing a third function on the system identifier, the PPS, and/or the PID to create the administrator password, as indicated by block 34. For example, on one embodiment, performing the third function on a system identifier may involve summing each byte of the PPS to create an 8 character administrator password. In addition, as indicated by block 36, the technique 24 may also involve concatenating, the PID, PPS, and administrator password into a 48 character string. It will be appreciated, however, that as described above, these mathematical functions are merely exemplary. As such, in alternate embodiments, any suitable mathematical or programmatic function may be employed within the technique 24. For example, in one embodiment, a single mathematical function may be employed to create the entire PSK and/or administrator password.

As described above, in one embodiment, the PO# for the computer system 14 may be employed as the identifier. In addition to being readily available during the manufacturing process, using the PO# as the identifier may enable a customer of the computer system 14 to reduce the number of PSKs and/or administrator passwords employed by their computer systems. For example, by ordering multiple computer systems in one purchase order, a customer could receive multiple computer systems with the same PSK and/or administrator passwords, due to the deterministic nature of the technique 24. Such a feature may advantageously ease customer deployment and/or support of the computer system 14.

Returning to FIG. 2, the technique 20 may also include uploading the generated PSK and/or administrator password into the computer system 14, as indicated by block 26. In one embodiment, the PSK and/or administrator password may be uploaded into the computer system 14 by the configuration unit 12 over the connection 16. For example, the configuration unit 12 may upload the PSK and/or administrator password into the computer system 14 during the manufacturing or production process. In alternate embodiments, the PSK and/or administrator password may be uploaded onto a storage media, such as a disc, semiconductor memory, or other suitable media, for future transmission to the computer system 14. For example, the PSK and/or administrator password may be stored on a flash memory device (e.g., a USB flash memory device) that accompanies the computer system 14 to its destination.

As described above, the configuration unit 12 may be configured to generate the PSK and/or administrator password for the computer system 14 by executing one or more mathematical functions on an identifier associated with the computer system 14. Advantageously, this functionality may reduce PSK and/or administrator password storage and management issues. More specifically, because the pre-shared keys generated by the configuration unit 12 are generated based on the identifier associated with the computer system 14 and the mathematical functions described above, the PSK and/or administrator password itself does not need to be stored and accessed by administrators and/or service technicians. Rather, given the identifier, an administrator or service technician may be able to recreate the PSK and/or administrator password for the computer system 14 for themselves using the mathematical function.

Figure 4:
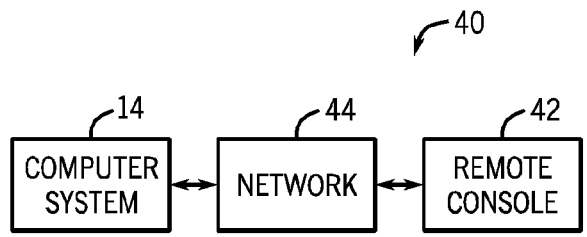
FIG. 4 is a block diagram of an exemplary computer network in accordance with one embodiment.
Figure 5:
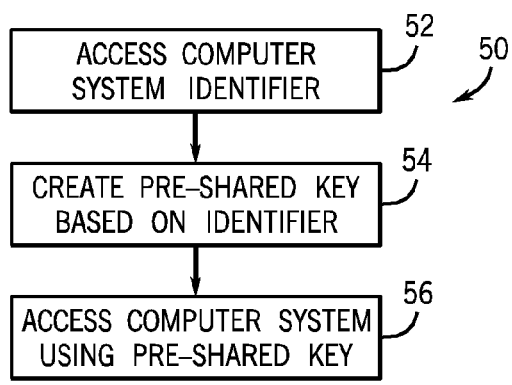
FIG. 5 is a flow chart illustrating an exemplary technique for accessing a computer system in accordance with one embodiment.

As described further below with regard to FIGS. 4 and 5, the PSK and/or administrator password, once recreated, may be employed by a remote console 42 to access the computer system 14 over a network 44 (see FIG. 4). For example, FIG. 5 is a flow chart illustrating an exemplary technique 50 for accessing a remote computer system in accordance with one embodiment. In one embodiment, the technique 50 may be employed on the remote console 42 by a network administrator, a service technician, and/or other suitable parties wishing to gain access to the computer system 14 using AMT over the network 44. For example, in one embodiment, code adapted to perform the technique 50 may be encoded onto a tangible medium located with the remote console 42. In another embodiment, the code adapted to perform the technique 50 may be encoded onto a tangible medium located within a personal digital assistant, laptop computer, and/or other suitable portable computing device.

As indicated by block 52, the technique 50 may begin with accessing the identifier associated with the computer system 14. In one embodiment, accessing the identifier associated with the computer system 14 may involve accessing a database of stored identifiers. For example, in one embodiment, accessing the identifier may involve accessing a database of purchase orders and retrieving the PO# that corresponds to the computer system 14. In another embodiment, accessing the identifier associated with the computer system 14 may involve communicating with the owner or administrator of the computer system 14. For example, a service technician wishing to access a customer's computers system using AMT during a telephone support call may ask the customer for the unique identifier (e.g., the serial number of the computer system 14). This unique identifier could then be entered into the remote console, which would execute the technique 50. In still other embodiments, other suitable techniques for accessing the identifier associated with the computer system 14 may be employed.

After accessing the identifier associated with the computer system 14, the technique 50 may include generating the PSK and/or administrator password based on the identifier, as indicated by block 54. In one embodiment, generating the PSK and/or administrator password includes performing the one or more mathematical functions described above on the identifier. For example, in one embodiment, the identifier may be entered into a computer or hand-held device that is configured to execute the technique 24 described above in regard to FIG. 3.

Next, as indicated by block 56, the technique 50 may include accessing the computer system using the generated PSK and/or administrator password. In one embodiment, accessing the computer system 14 using the PSK and/or administrator password may include accessing the computer system 14 over a network from a remote location to perform maintenance, upgrades, or repairs. Advantageously, being able to generate a PSK and/or administrator password based on the identifier may increase security for the computer system 14 by providing the PSK and/or administrator password at a remote location without having to transmit it over an unsecured network.

Many of the modules or blocks described above with reference to FIGS. 1-5 may comprise code adapted to implement logical functions. Such code can be embodied in a tangible machine readable medium for use by or in connection with a computer-based system that can retrieve the instructions and execute them to carry out the previously described processes. In the context of this application, the tangible computer-readable medium may contain or store the instructions. By way of example, the computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette, a random access memory ("RAM") a read-only memory ("ROM"), an erasable programmable read-only memory ("EPROM" or Flash memory), and/or an optical disk.

While the invention described above may be susceptible to various modifications and alternative forms, specific embodiments have been shown by way of example in the drawings and have been described in detail herein. It should be understood, however, that the invention is not intended to be limited to the particular embodiments disclosed.

What is claimed is:

1. A method comprising:
accessing an identifier associated with a computer system;
performing at least one mathematical function by a configuration unit on the identifier to create a pre-shared key for the computer system, wherein performing the at least one mathematical function includes:
 performing a first mathematical function on the identifier to create a product ID; and
 performing a second mathematical function on the identifier and the product ID to create a passphrase;
performing a third mathematical function to create an administrator password; and
concatenating the product ID, the passphrase, and the administrator password.

2. A non-transitory computer readable medium comprising:
code adapted to access an identifier associated with a computer system; and
code adapted to perform at least one mathematical function on the identifier to create a pre-shared key for the computer system, wherein performing the at least one mathematical function includes:
 performing a first mathematical function on the identifier to create a product ID; and
 performing a second mathematical function on the identifier and the product ID to create a passphrase;
performing a third mathematical function to create an administrator password; and
concatenating the product ID, the passphrase, and the administrator password.

3. A method comprising:
receiving at a remote console an identifier associated with a computer system from a customer;
entering the identifier into a software program configured to create a pre-shared key for the computer system based on the identifier; and
accessing the computer system using the pre-shared key, wherein creating the pre-shared key for the computer system based on the identifier includes:
 performing a first mathematical function by a configuration unit on the identifier to create a product ID; and
 performing a second mathematical function by the configuration unit on the identifier and the product ID to create a passphrase;
performing a third mathematical function to create an administrator password; and
concatenating the product ID, the passphrase, and the administrator password.

* * * * *